United States Patent [19]

Suzuki

[11] Patent Number: 4,799,215

[45] Date of Patent: Jan. 17, 1989

[54] HIGH-SPEED PACKET-SWITCHED COMMUNICATIONS SYSTEM WITH END-TO-END FLOW CONTROL AND RETRANSMISSION

[75] Inventor: Hiroshi Suzuki, Tokyo, Japan

[73] Assignee: NEC Corporation, Tokyo, Japan

[21] Appl. No.: 916,429

[22] Filed: Oct. 7, 1986

[30] Foreign Application Priority Data

Oct. 7, 1985 [JP] Japan .................... 60-224430
Oct. 11, 1985 [JP] Japan .................... 60-226249
Oct. 11, 1985 [JP] Japan .................... 60-226250

[51] Int. Cl.[4] .......................................... H04Q 11/04
[52] U.S. Cl. .......................................... 370/60; 370/94
[58] Field of Search ................ 370/94, 60; 371/33; 340/825.5, 825.52

[56] References Cited

U.S. PATENT DOCUMENTS 4,484,326 11/1984 Turner ........................ 370/94
4,621,359 11/1986 McMillen .................... 370/94
4,630,259 12/1986 Larson et al. ................ 370/60

OTHER PUBLICATIONS

Puzin, Methods Tools & Observations on Flow Control In Pkt. Switched Networks, IEEE, vol. COM-29, #4, Apr. 1981.

Primary Examiner—Douglas W. Olms
Attorney, Agent, or Firm—Foley & Lardner, Schwartz, Jeffery, Schwaab, Mack, Blumenthal & Evans

[57] ABSTRACT

In a packet switched communications system having a plurality of switching nodes, each user terminal transmits a packet of data-link layer control protocol including a network-layer control protocol to an adjacent switching node to cause it to be routed to an outgoing transmission link according to the network layer control protocol of the packet. Each switching node includes a plurality of line controllers to receive packets from the transmission links to update the network control protocol of a received packet with a logical address of the packet at the outgoing link and append a physical address of the outgoing link to the packet before transmission. Each switching node monitors the traffic flow of each line controller to detect whether it is overflowed. If overflow traffic is detected in a line controller, the latter is identified accordingly and an overflow traffic table is loaded with information to indicate which of the line controllers is overflowed. The table is accessed by each line controller whenever it receives a packet to be informed of whether the desired line controller is overflowed or not. If it is, the received packet is discarded.

15 Claims, 14 Drawing Sheets

FIG.12A

CALL SETUP TABLE

| PACKET ID(TYP) | INC. ROUTE NO. (IRN) | INC. LOG. CHA. NO. (ILCN) | OG. ROUTE NO. (ORN) |
|---|---|---|---|
| CTRL | 1 | 0 | 0 |
|  |  | 1 | 0 |
|  |  | 2 | 0 |

OUTGOING ROUTE TABLE

| PACKET ID(TYP) | INC. ROUTE NO. (IRN) | INC. LOG. CHA. NO. (ILCN) | OG. ROUTE NO. (ORN) | OG. LOG. CHA. NO. (OLCN) |
|---|---|---|---|---|
| MESSAGE | 1 | 0 | 2 | 1 |
|  |  | 1 | 3 | 2 |
|  |  | 2 | – | – |

INCOMING ROUTE TABLE

| OG. ROUTE NO. (ORN) | OG. LOG. CHA. NO. (OLCN) | INC. ROUTE NO. (IRN) | INC. LOG. CHA. NO. (ILCN) | SOURCE TERM'NL |
|---|---|---|---|---|
| 2 | 0 | – | – | – |
|  | 1 | 1 | 0 | PT(A) |
|  | 2 | – | – | – |

OVERFLOW CONTROL TABLE

| ILCN | CONG / FREE |
|---|---|
| 0 | CONG. |
| 1 | FREE |
| 2 | – |
| 3 | – |

ROUTING TABLE 57

| DESTINATIONS | PRIMARY ROUTES | | ALTERNATE ROUTES | |
|---|---|---|---|---|
| | ROUTE NO. | CONG./FREE | ROUTE NO. | CONG./FREE |
| PT (A) | #3 | FREE | #2 | FREE |
| PT (B) | #0 | FREE | — | — |
| PT (C) | #1 | CONG. | #2 | FREE |
| PT (D) | #2 | FREE | #3 | FREE |
| ---- | ----- | ----- | ------ | ----- |

HIGH-SPEED PACKET-SWITCHED COMMUNICATIONS SYSTEM WITH END-TO-END FLOW CONTROL AND RETRANSMISSION

BACKGROUND OF THE INVENTION

The present invention relates to a packet-switched communications system which is capable of high speed, high throughput switching operations to handle a variety of traffic patterns by efficient utilization of system resources.

According to a prior art packet switched communications system, flow control with a higher-level data link control and error recovery retransmission control are effected on a link-by-link throughout the network. These techniques are needed because the transmission speed of the prior art packet switching system is low, typically in the range between several Kbps and several tens of Kbps and the bit error rate is relatively high. Since these techniques involve a large number of complicated procedures, they require a lengthy period execution time. In addition, the execution of such procedures must be repeated at locations where packets are retransmitted over the network, resulting in packets arriving at delayed times.

The introduction of optical fibers as a high speed high quality transmission medium allows reduction of packet transmission delay. However, the amount of delay involved in the execution of link-by-link flow control and retransmission is becoming a dominant factor of the total delay time. On the other hand, the frequency at which the retransmission process must be effected has decreased significantly with the reduction of transmission bit error rate and the control overhead for link-by-link retransmission increases significantly. As a result, a high speed, high throughput packet switched communications system cannot be implemented with the introduction of high speed, high quality transmission media without improvement of the switching speed of the packet switching system, More specifically, FIG. 1 shows a packet transfer sequence effected between end terminals according to a prior art packet switched communications system. In FIG. 1, character L represents the execution of flow control and retransmission control, on a link-by-link basis, L(S) indicates a transmission execution and L(R) indicates a reception execution. Character N represents a packet switching operation by means of which a route is determined for each packet. D#n represents the packet and ACK(L) and ACK#n represent link-by-link acknowledgement and end-to-end acknowledgement, respectively. RGJ(L)#n represents a request for retransmission between links and ERR indicates that a packet has been affected by an error during transmission. The number of frames which can be continuously transmitted between switching offices, or "nodes" and the number of frames which can be continuously transmitted between end users are both assumed to be "8". Since no acknowledgment ACK is returned to packets D#0 to D#14 generated by a terminal PT(A) and eight packets can be continuously retransmitted, the first eight packets D#0 through D#7 are allowed entry to the network. Acknowledgement ACK(L) is returned at each link and acknowledgement ACK#n is returned to the source terminal to indicate that the destination terminal has correctly received packets D#0 through D#n. Assume that an error has occurred in packet D#4 during transmission between nodes PS(A) and PS(B) and node PS(B) returns a request for retransmission REJ(L)#4 to node PS(A) and the latter retransmits packets D#4 through D#7 to node PS(B). When acknowledgment ACK#4 is returned to source terminal PT(A), the remaining four data packets are allowed entry to the network.

As can be seen from FIG. 1, the amount of processing time at each node is substantial particularly when speech signal is transmitted. Because of the redundancy of information in the speech signal, no retransmission is required even if packets are noise affected at low frequency. Although buffer overflow in an interface node can be avoided, it is impossible to directly restrict the traffic at the entry point of the network when overflow occurs in an intermediate node. As a result, the traffic congestion in an intermediate node is likely to migrate to neighboring nodes.

SUMMARY OF THE INVENTION

It is therefore an object of the present invention to provide a high-speed packet switched communications system and a high-speed packet switching system incorporated in the communications system to serve as a switching node.

The foregoing problems are eliminated by the packet switched communications system of the invention by the employment of end-to-end flow control and retransmission instead of the link-to-link method of flow control and retransmission.

The communications system includes a plurality of switching nodes for serving a plurality of terminals through transmission links. Each of said terminals transmits a packet of data link layer control protocol including a network layer control protocol to one of said switching nodes. Each of the switching nodes comprises means responsive to the network control protocol of the packet for routing the packet to one of the transmission links defined by the network layer control protocol of the packet.

Preferably, the routing means comprises a plurality of line controllers associated respectively to the transmission links, each of the line controllers including means for appending a physical address of said packet at the defined transmission link, updating the network layer control protocol of the packet with a logical address of the packet at the defined transmission link and sending the updated packet to one of the line controllers corresponding to the defined transmission link. A switching network interconnects the line controllers.

According to another aspect of the present invention, each of said terminals is capable of returning an acknowledgment to a source terminal when a packet is correctly received therefrom, transmitting a series of packets without receiving the acknowledgment and retransmitting to a destination terminal a packet which has not been correctly received. Each switching nodes detects the degree of congestion of traffic in a buffer which receives packets from an adjacent node or terminal and transmits a traffic control signal instructing the cessation of transmission of packets when said detected degree of congestion exceeds a predetermined level, and halts the transmission of a packet which is to be transmitted to the adjacent switching node or terminal upon receipt of the traffic control signal.

According to a second aspect of the invention, the communications system is of a virtual circuit type in which a call is established through a logical channel between source and destination terminals in response to a control packet of a multipacket message and the logical channel is permanently established until the call terminates to allow message packets of the multipacket message to follow the established channel. Each terminal is capable of retransmitting a packet to a destination terminal which is not correctly received by the destination terminal. Each of switching node comprises means for detecting the degree of congestion of traffic in a buffer which receives packets from an adjacent switching node or terminal and transmitting a traffic control signal indicating a cessation of transmission of packets when the detected degree of congestion exceeds a predetermined level. In response to the traffic control signal the transmission of a packet which is to be transmitted to the adjacent switching node or terminal is stopped and a timeout signal is generated when the traffic control signal is present for a predetermined time interval. The establishment of a logical channel to the adjacent switching node is prevented in response to the timeout signal. The logical channel established between the adjacent switching node and the destination terminal is determined and the source terminal is identified in accordance with the detected logical channel to prevent the transmission of packets from the source terminal. An alternate route is then established for routing the call from the source terminal to the destination terminal.

According to a third aspect of the invention, a packet switching system is provided having a plurality of line controllers and a central processor which are connected by a switching network, wherein the switching system handles a multipacket message comprising a control packet and one or more message packets, each of the packets having a logical channel number. The switching system determines a logical channel in response to the control packet and the relationship between the route number of an outgoing transmission link through which the logical channel passes and the channel number of the logical channel and sends a routing signal representing the determined relationship through the network to each of the line controllers. Each of the line controllers comprises a memory in which the routing information is stored. A logical channel number is extracted from a message packet as it is received by the line controller to access the memory to read the route number of an outgoing transmission link through which the message packet is to be transmitted and the logical channel number of the packet at the outgoing transmission link. The message packet is processed by updating its logical channel number with the detected logical channel number and by appending the detected route number to the message packet and routed through the network to one of the line controllers associated with said outgoing transmission link.

BRIEF DESCRIPTION OF THE DRAWINGS

FIGS. 12A, 12B, 12C are illustrations of the contents of the call setup, outgoing route and incoming route tables, respectively, of FIG. 7 and FIG. 12D is an illustration of the contents of the overflow control table of FIG. 7;

FIG. 15 is an illustration of the contents of the routing table of FIG. 11; and

DETAILED DESCRIPTION

Structures and Functions

Figure 2:
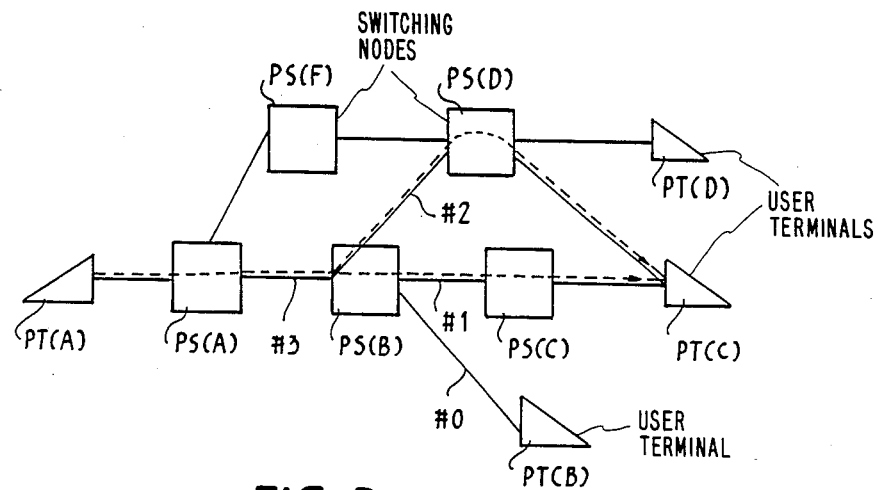
FIG. 2 is a schematic illustration of a packet switched communications system embodying the present invention, which is useful for description of the end-to-end flow control and alternate routing operations.

A virtual-circuit packet-switched communications system embodying the present invention is shown in FIG. 2. The communications system comprises a plurality of packet switching offices or "nodes" PS and end users or "terminals" PT(A), PT(B) and PT(C) which terminate at interface nodes PS(A), PS(B) and PS(C), respectively. For purposes of illustration, the terminal PT(C) is shown as having an alternate transmission link to the interface node PS(D). In the virtual-circuit network, the transmission capacity is assigned on an "as needed" basis, but all packets of a multipacket message follow the same route through the network. Before interactive communication begins, a route is established through the network in response to a call-establishing control packet, and all participating nodes are informed of the connection and how to route the individual packets that follow. The route so established is a virtual circuit, or "logical channel" as is interchangeably used in data communications art. At the end of a connection, a virtual circuit is released by a call-clearing control packet propagating through the network.

Figure 3:
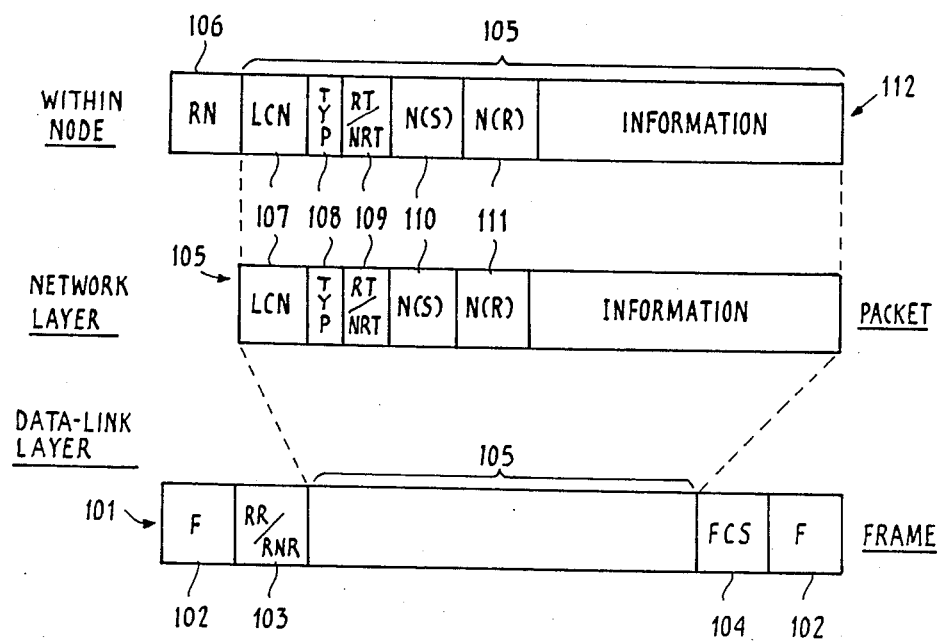
FIG. 3 is an illustration of a data format according to the present invention.

To eliminate the prior art link-by-link method of flow control to achieve high speed packet switching, frame and packet formats are provided as shown in FIG. 3 which respectively correspond to data-link layer and network layer protocols. A network-layer packet 105 is transmitted between a terminal and an interface switching node and between adjacent switching nodes in the form of a frame 101 by appending to the network layer packet a data-link layer header field which comprises start and closing flags 102, a receive-ready/receive-not-ready subfield 103 and a frame check sequence 104. This data-link layer header is processed by participating switching nodes in the network and the terminals. The packet comprises a logical channel number subfield 107, a packet identifier 108 designated "TYP", a retransmission enable/disable subfield 109 designated "RT/NRT", and subfields 110 and 111 designated N(S) and N(R), with N(S) indicating the sequence number of packets sent on a common logical channel from a source node and N(R) indicating the sequence number of packets sent to the source node from a receiving node.

The packet identifier identifies a packet with a particular characterization including control, message, traffic congestion (CONG), congestion-free (FREE), acknowledgment (ACK), and retransmission request (REJ). The subfield RT/NRT with a binary "0" enables the retransmission request packet (REJ) to be transmitted and with a binary "1" indicating the disablement of the retransmission packet.

Figure 4:
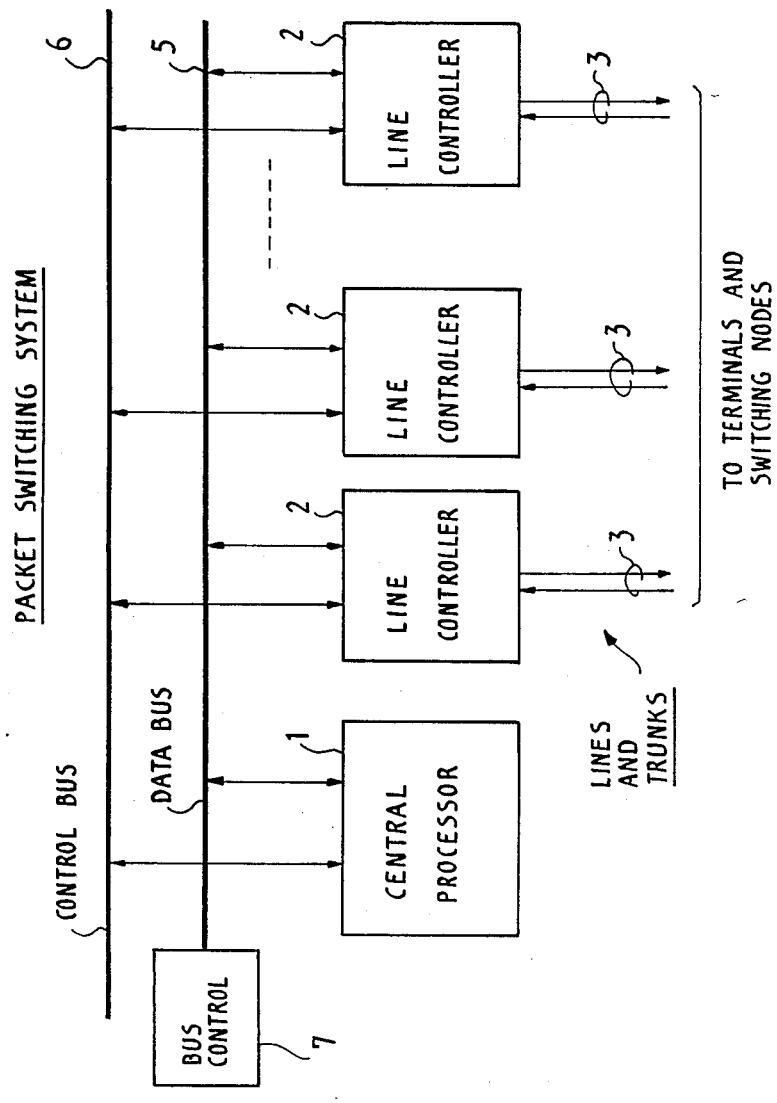
FIG. 4 is a block diagram of a packet switching system embodying the present invention.

As illustrated in FIG. 4, each packet swtiching node comprises a central processor 1, a plurality of line controllers 2 to which associated end users or adjacent nodes are connected by way of transmission links 3 which may be four-wire lines or full-duplex facilites. Each line controller 2 operates as an incoming line controller or an outgoing line controller. A control packet is transferred from an incoming line controller through a control bus 6 to the central processor 1 where it is processed and transferred to an outgoing line controller whenever a connection is set up or released. Central processor 1 stores routing information regarding the incoming and outgoing route numbers and incoming and outgoing logical channel numbers whenever a connection is established by address data contained in the control packet. Message packets are transferred between incoming and outgoing line controllers 2 over a data bus 5 under the control of a bus controller 7.

Figure 5:
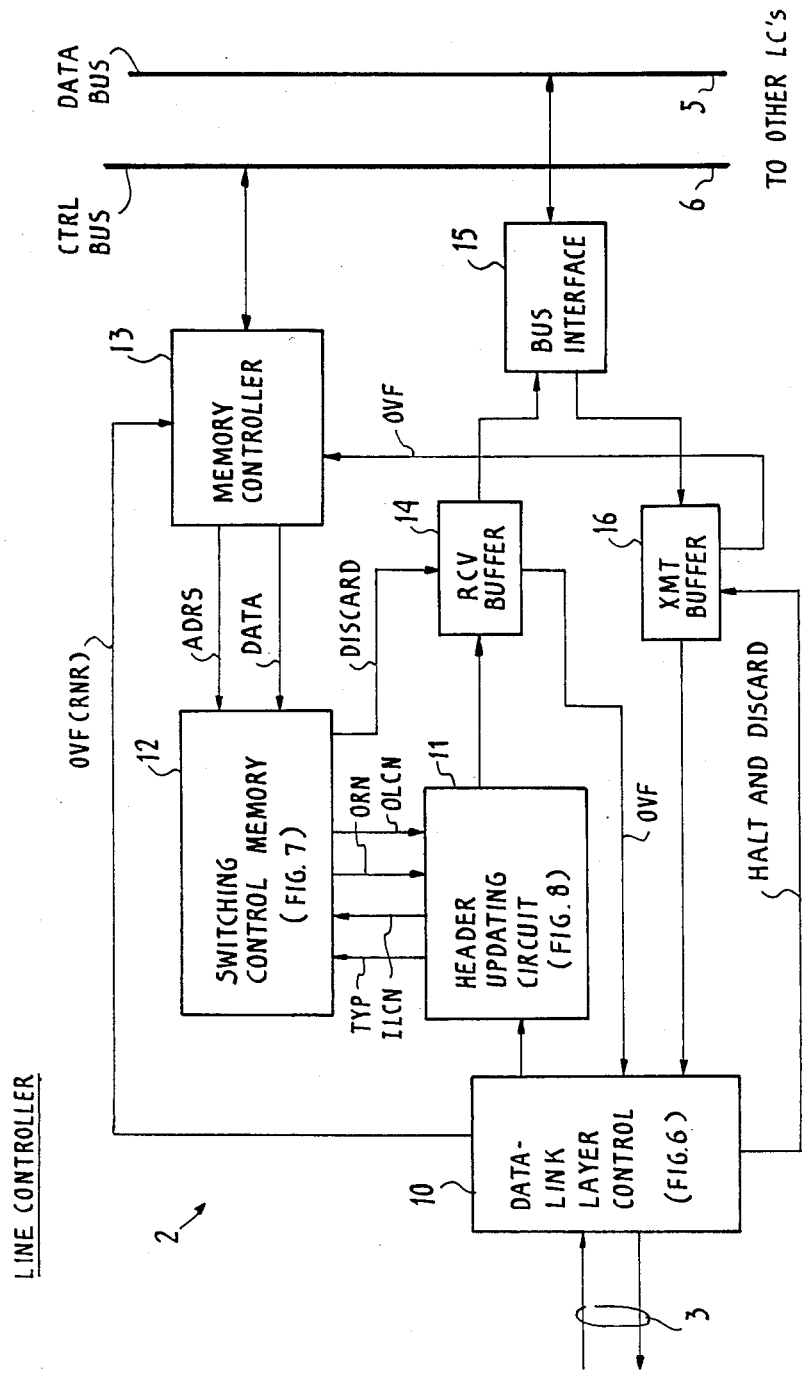
FIG. 5 is a block diagram of each of the line controllers of FIG. 4.

Details of line controller 2 are shown in FIG. 5. When controller 2 operates as an incoming line controller, the link 3 is the incoming route and packets received on link 3 from a source user are passed through a data-link layer controller 10 and a header updating circuit 11 to a receive buffer 14 for transfer to an outgoing line controller 2. When packets are transferred from an incoming line controller and sequentially stored into the transmit buffer 16, the line controller operates as an outgoing line controller for transmitting the packets through the data-link layer controller 10 on link 3 to a destination user.

Header updating circuit 11 has an input from the data-link layer controller 10 to examine the header field of a packet received from the controller 10 and extract the logical channel number from the LCN subfield 107 and the packet identifyer from the TYP subfield 108 of the packet. Updating circuit 11 uses the extracted data as an address to access a switching control member 12 which is updated by a memory controller 13 with routing information supplied from the central processor 1 in response to the establishment of a connection by each of the line controllers 2. During the period following a call setup, the data read out of the memory 12 by the header updating circuit 11 indicates the outgoing route number RN and outgoing logical channel number LCN. Updating circuit 11 inserts the outgoing route number to a subfield 106 of a message packet and the outgoing logical channel number into the LCN subfield of the packet so that it appears as shown at 112 in FIG. 3 at the input of the receive buffer 14. If the packet is a control packet, the logical channel number of the packet remains unchanged and the outgoing route number is updated such that the control packet is routed to the central processor 1 through receive buffer 14 and an interface 15. The updated message packet is routed to an outgoing line controller identified by the outgoing route number and logical channel number indicated by the header field of the message packet.

Figure 9:
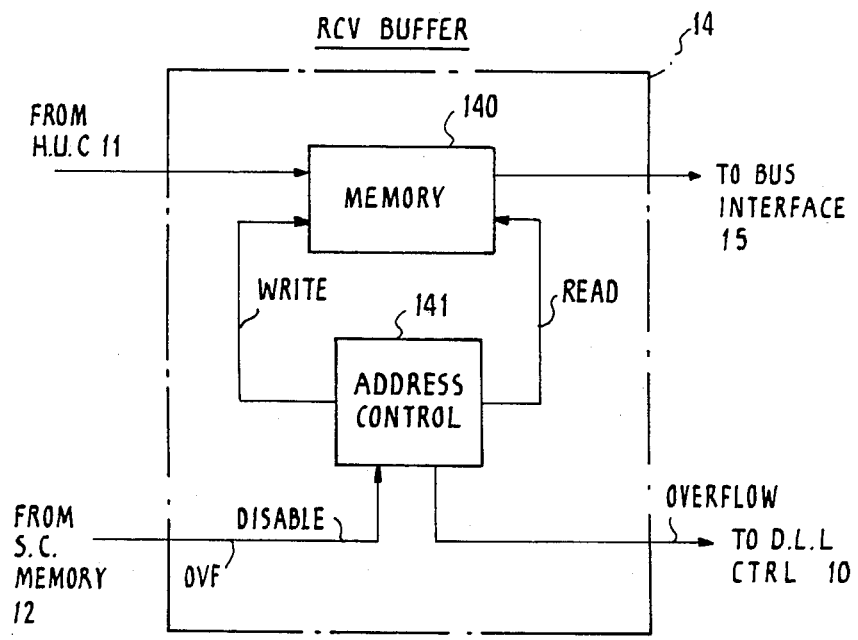
FIGS. 9 and 10 are details of the receive buffer and transmit buffer of FIG. 5, respectively.

Receive buffer 14 has a control input from the switching and overflow control memory 12 to receive a node overflow signal and a control output leading to the data-link layer controller 10 to supply to it a buffer-overflow signal (RNR). As shown in FIG. 9, the receive buffer 14 includes a memory 140 having a data input terminal connected to the output of the header updating circuit 11 and an output terminal connected to the bus interface 15. An address controller 141 controls the memory 140 with write and read enable signals at proper timing in response to a system clock under normal conditions and examines the storage level of the memory 140 to generate the buffer overflow signal when it is filled with more than normal packets. Address controller 141 responds to the node overflow signal by disabling the read/write operation.

Figure 10:
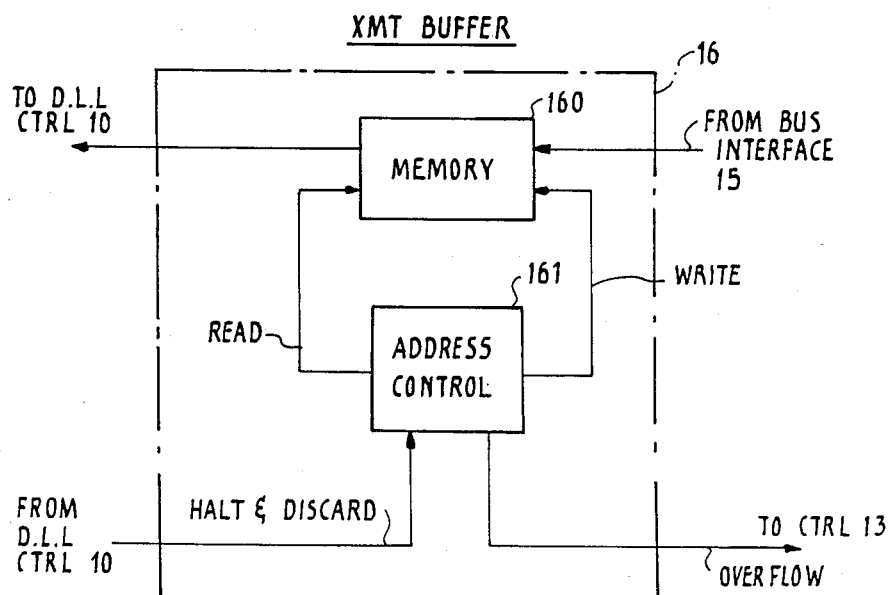

Transmit buffer 16 has a control input connected from the data-link layer controller 10 to receive a hald-and-discard signal and a control output leading to the controller 13 to supply to it a transmit buffer overflow signal. As shown in FIG. 10, the transmit buffer 16 includes a memory 160 having a data input terminal connected to the bus interface 15 and an output terminal connected to the data-link layer controller 10. An address controller 161 controls the memory 160 with write and read enable signals at proper timing in response to a system clock under normal conditions and examines the storage level of the memory 160 to generate the transmit buffer overflow signal when it is filled with more than normal packets. Address controller 161 responds to the halt-and-discard signal by disabling the read/write operation.

Figure 6:
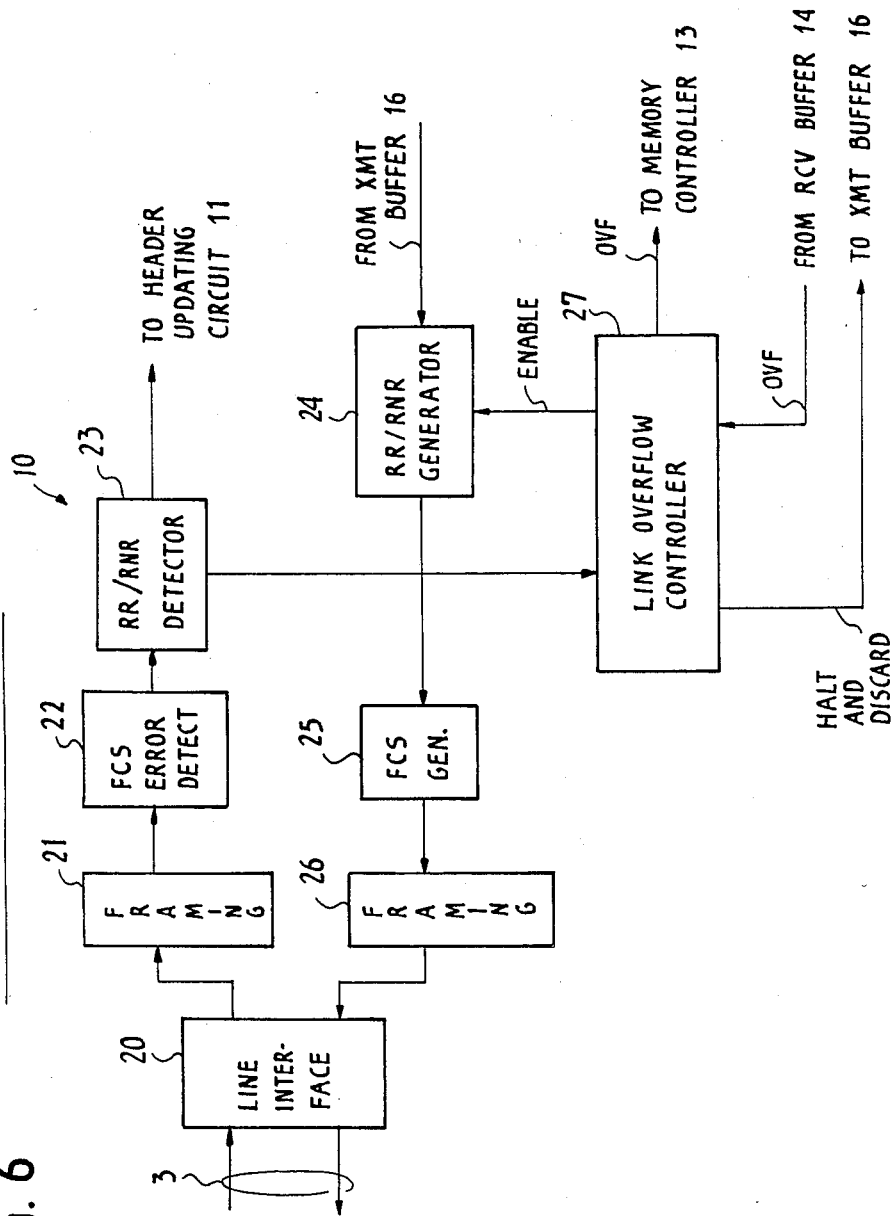
FIG. 6 is a block diagram of the data-link layer controller of FIG. 5.

Specifically, in FIG. 6, the data-link layer controller 10 provides data-link layer process by detecting start and closing flags, a frame check sequence and an RR/RNR subfield in a packet received through a line interface 20 and by appending such data-link layer subfields to a packet to be sent through the interface 20. To this end, a framing circuit 21, an FCS error detector 22 and an RR/RNR (receive-ready/ receive-not-ready) detector 23 are connected in a series circuit from the interface 20 and the header updating circuit 11. An RR/RNR generator 24, an FCS generator and a framing circuit 26 are connected in series from the output of transmit buffer 16 and the line interface 20 to provide the data-link-layer process. The RR/RNR detector 23 applies an output signal to a link overflow controller 27 when the RR/RNR subfield indicates that a "receive-not-ready" condition, or traffic overflow has occurred in an adjacent node.

The function of the link overflow controller 27 includes the detection of the presence of a "receive-not-ready" signal returned from the adjacent node, the detection of its continuity exceeding a predetermined time interval and the application of a link-overflow signal to the controller 13. This is to allow an intermediate switching node to determine the source terminal and send to it a congestion (CONG) signal to prevent the outgoing traffic at entry point of the network in order to reduce the volume of traffic from an intermediate node to an adjacent node. At the same time, link overflow controller 27 causes the transmit buffer 16 to stop sending packets to the source terminal. If the storage level of the buffer 16 exceeds a predetermined value as a result of the cessation of packet transmission, controller 27 causes buffer 16 to discard the first of packets that form a queue in the buffer 16 waiting to be served. Further, link overflow controller 14 has an input from the receive buffer 14 to respond to a "buffer overflow" signal by enabling the RR/RNR generator 24 to reduce the amount of traffic from the adjacent node or terminal by indicating that a receive buffer is overflowd. The RR/RNR generator 24 operates when the traffic in the opposite direction is overflowed.

Figure 7:
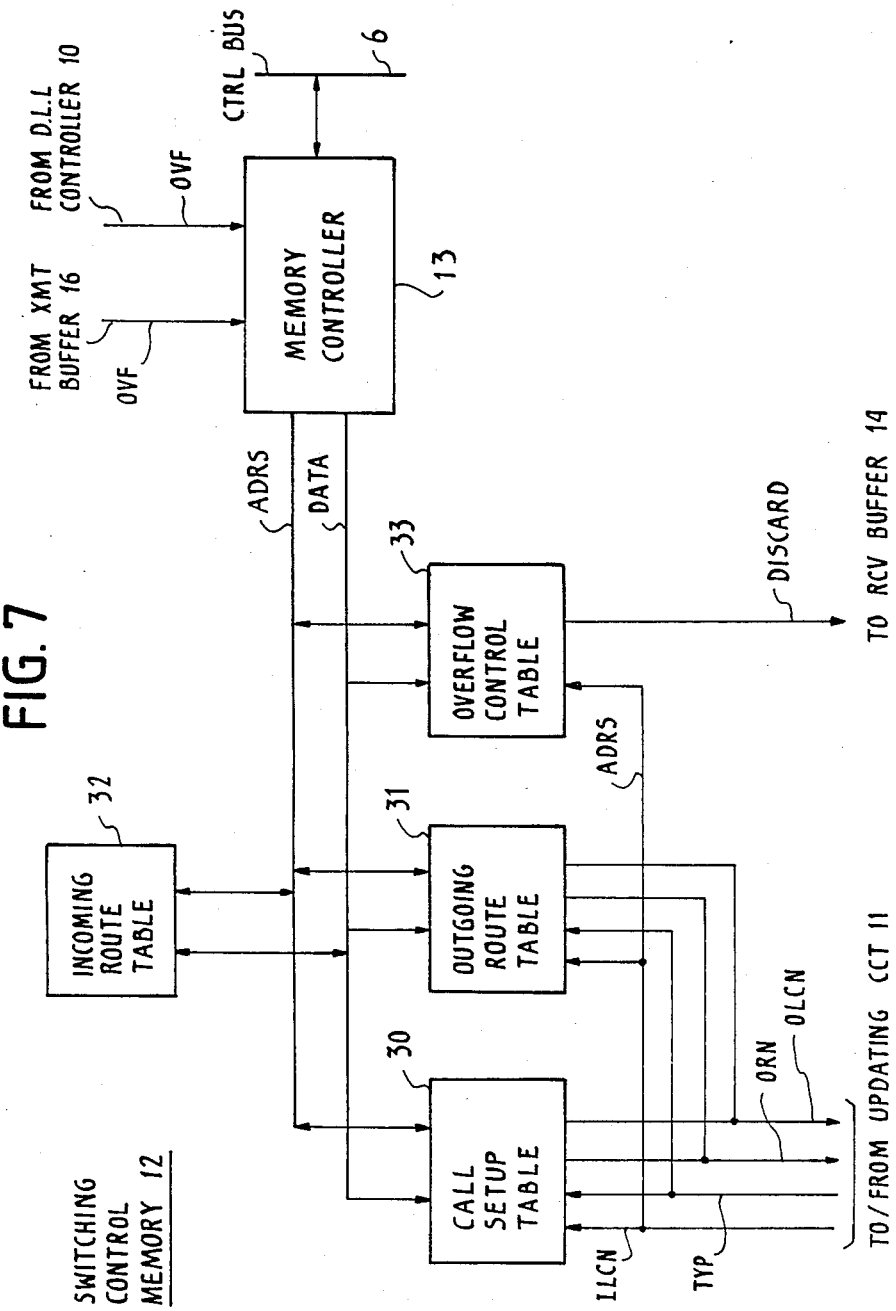
FIG. 7 is a block diagram of the switching control memory of FIG. 5.

In FIG. 7, the switching control memory 12 comprises a call setup table 30, an outgoing route table 31, an incoming route table 32 and an overflow control table 33. The outgoing and incoming route tables 31 and 32 are updated by the memory controller 13 by way of the central processor 1. More specifically, the call setup table 30 stores an outgoing route number (which is permanently indicative of the address of the central processor 1) in a storage location addressable as a function of the packet identifier (TYP) and incoming logical channel number (ILCN) subfields of a control packet together with the incoming route number (IRN) which identifies the line controller handling the control packet (see FIG. 12A). During call setup phase, the call setup table 30 is accessed by the header updating circuit 11 to direct it to the central processor 1 where it is processed for call establishment in a manner as will be described later. The outgoing route table 31 stores a set of outgoing route number (ORN) and outgoing logical channel number (OLCN) in a location addressable as a function of the incoming route number (IRN) and incoming logical channel number (ILCN) subfields of a message packet (FIG. 12B). Header updating circuit 11 accesses the outgoing route table 31 to update the incoming logical channel number (ILCN) of a message packet and append to it the outgoing route number to direct the message packet to an outgoing line controller. Incoming route table 32 stores a set of incoming route number (IRN), incoming logical channel number (ILCN) and the address of a source terminal (PT) into a location addressable as a function of the outgoing route number (ORN) and outgoing logical channel number (OLCN) subfields of either control or message packet (FIG. 12C). During a read mode, the incoming route table 32 is accessed by the controller 13 to read out the stored incoming routing data and source terminal address to provide traffic control.

It is to be noted that there is a one-to-one correspondence between the outgoing and incoming route tables 31 and 32 except for the source terminal address so that a set of incoming route number and incoming logical number can be determined by a set of outgoing route number and outgoing logical channel number, and vice versa. This permits the memory controller 13 to obtain routing information as to the source terminal to impose access restriction at the entry of the network.

Overflow control table 33 stores overflow control data as shown in FIG. 12D which indicates the traffic conditions of outgoing routes. This table is used by incoming-mode line controllers to determine whether the outgoing route for an incoming logical channel number is overflowed or not whenever it receives a packet.

Table 33 is updated under control of the memory controller 13 of the incoming line controller when it is informed of an incoming logical channel number by an outgoing line controller 2 of which the outgoing route is overflowed. This occurs in response to the generation of an overflow signal by the transmit buffer 16 of the outgoing line controller when the storage level of the buffer 16 exceeds a predetermined value.

Specifically, when the transmit buffer 16 of a given outgoing line controller 2 is overflowed, the memory controller 13 of this line controller communicates this fact to the incoming line controller or controllers that extend their incoming logical channels through the overflowed outgoing route.

The determination of the incoming line controller or controllers by the outgoing line controller is accomplished by use of its incoming route table 32 by the memory controller 13. For example, incoming route table 32, FIG. 12C, indicates that an incoming logical channel ILCN=0 is passing through an outgoing route ORN2 on an outgoing logical channel OLCN=1. ILCN=0 is used by the incoming line controller to access the overflow control table 33 to update the storage location of ILCN=0 with a congestion signal CONG. As will be described later, the overflow control table 33 of each incoming line controller is accessed by the header updating circuit 11 as a function of the incoming logical channel number of a packet it receives to control its traffic if it passes through the overflowed outgoing route.

When the traffic congestion is relieved, the transmit buffer 16 of the outgoing line controller notifies this fact to the incoming line controller or controllers to cause them to update their overflow control table 33 accordingly.

Figure 8:
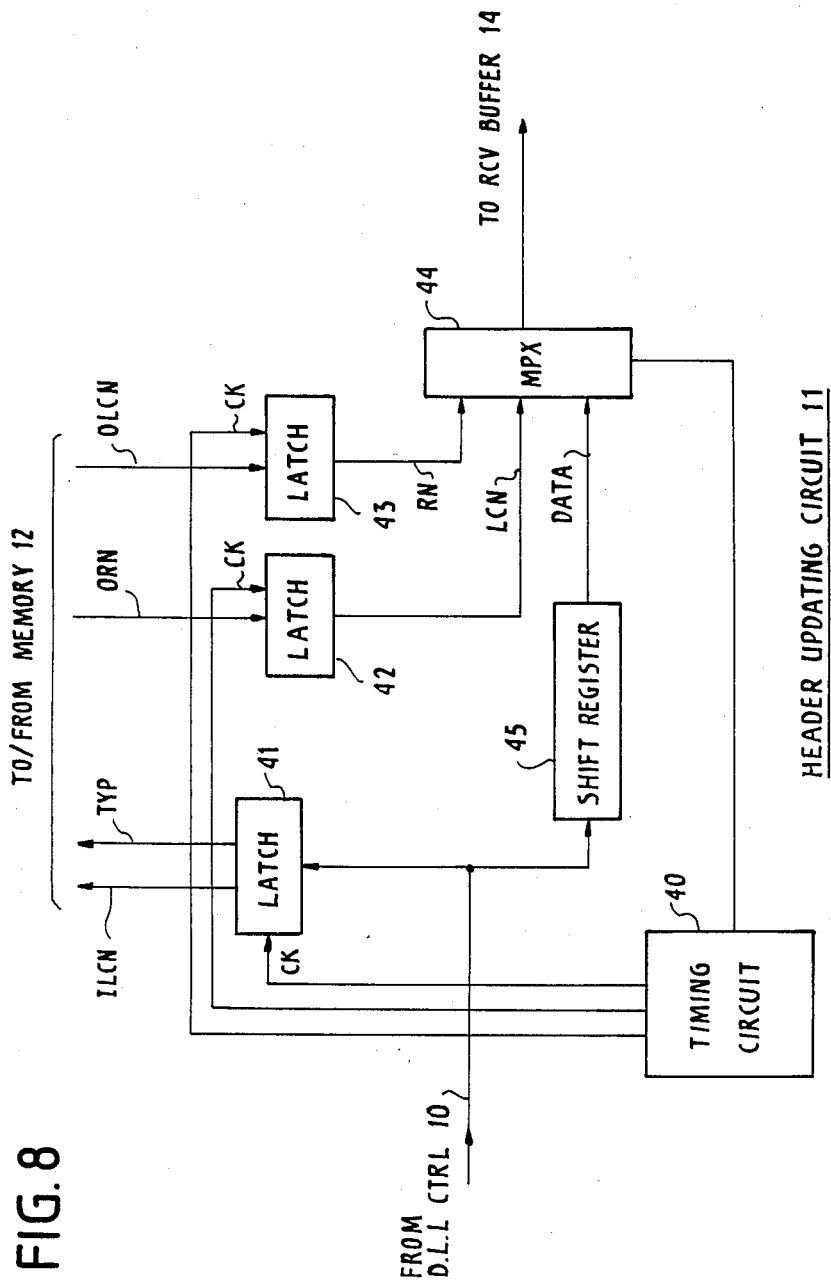
FIG. 8 is a block diagram of the header updating circuit of FIG. 5.

Header updating circuit 11 is shown in detail in Fig. 8. This circuit comprises a timing circuit 40 that supplies timing signals to latches 41, 42 and 43 and to a multiplexer 44, and a shift register 45. Incoming packets from data-link layer controller 10 are applied to latch 41 and shift register 45. Latch 45 extracts the logical channel number and packet identifier for coupling to switching control memory 12 in response to a timing pulse from the timing circuit 40. The outgoing route number and outgoing logical channel number from the switching control memory 12 are stored into latches 42 and 43. Multiplexer 44 is properly timed to multiplex the outputs of latches 42 and 43 with the output of shift register 45, whereby the logical channel number subfield of the packet is updated and the outgoing route number subfield is appended to the packet for it to be processed within the switching node.

Figure 11:
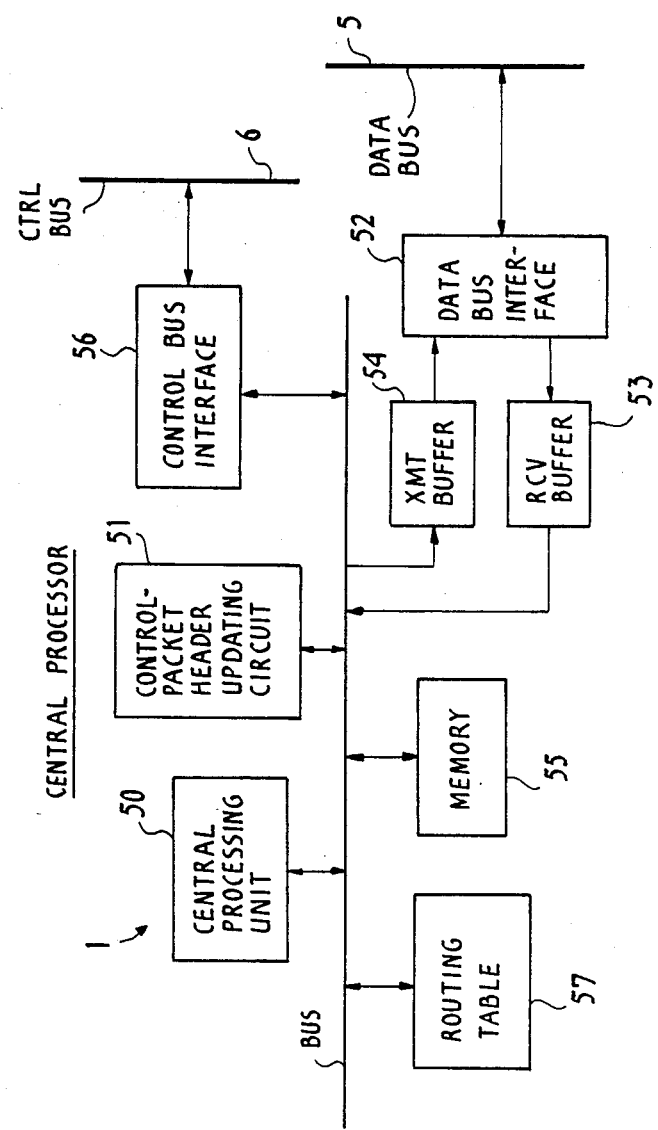
FIG. 11 is an illustration of details of the central processor of FIG. 4.

Central processor 1, shown in FIG. 11, comprises a central processing unit 50 which determines the outgoing logical channel number in accordance with the address of the destination terminal contained in a control packet it receives from an incoming line controller by way of data bus 5, data bus inerface 52 and receive buffer 53. Central prcessing unit 50 determines the outgoing route number of the control packet and appends it to the control packet. A control-packet header updating circuit 51 updates the logical channel number subfield of the control packet with the outgoing logical channel number determined by the CPU 50. The control packet with the LCN subfield updated and an outgoing route number being appended thereto is sent through transmit buffer 54, interface 52 and data bus 5 to the line controller 2 specified by the outgoing route number. A memory 55 serves an aid for the CPU 50 to process control packets and stores the routing information of each packet in response to the establishment of a connection. The routing information is also transferred through a bus interface 56 and control bus 6 to all the line controllers 2 to update their outgoing and incoming route tables 31 and 32. Further included in the central processor 1 is a routing table 57 which is used to determine an outgoing route for leach call or an alternate route when link overflow is encountered on the initial route.

Call Setup and Packet Switching

A call setup procedure is initiated upon arrival of a call-establishing control packet of a multi-packet message at the data-link layer controller 10 of an incoming line controller through the transmission link 3. Following the processing of data-link layer control including framing, frame-check-sequence error detection, and RR/RNR detection, the control packet is supplied to the header updating circuit 11, FIG. 8. The logical channel number LCN and the packet identifier TYP of the control packet are sent from latch 41 to the outgoing route table 30 of switching control memory 12. As illustrated in FIG. 12A, the outgoing route is permanently fixed to "0" which causes the control packet to be transferred to the central processor 1. An outgoing logical channel number and an outgoing route number are determined by the central processor in accordance with the address of a sink terminal indicated by the control packet to subsequently transfer the control packet to the desired outgoing route. Central processor 1 proceeds to rewrite the outgoing route table 31 of the incoming line controller 2 with the determined outgoing logical channel number and outgoing route number and rewrite the incoming route table 32 of the outgoing line controller 2 with the incoming route number and incoming logical channel number. Simultaneously, the head updating circuit 51 of central processor 1 updates the logical channel number subfield of the control packet and appends the determined outgoing route number to it as a new subfield forming a packet 112 as shown in FIG. 2 and sends it to the outgoing line controller of the determined route.

After the connection is established, message packets, either data or voice, are sequentially supplied to the data-link layer controller 10. Controller 10 provides the same data-link layer control on message packets as it does on the control packet. Header updating circuit 11 extracts the incoming logical channel number and packet identifier from the message packet it received from controller 10 and utilizes the extracted data to look up the outgoing route table 31 of the switching control memory 12 to read out the outgoing logical channel number (OLCN) and outgoing route number (ORN) which have been established by the preceding control packet. The LCN subfield of the message packet is updated with the LCN data read out of the outgoing route table 31 and the RN data is appended to it as a new subfield by the header updating circuit 11 for routing it to a desired outgoing link, as mentioned previously. All the message packet thus follow the same route as established by the control packet.

When a connection is to be released, a call-clearing control packet is sent from the source terminal and is treated so that the stored outgoing and incoming routing information relating to the connection are erased.

As can be seen from the above that according to the present invention control packets and message packets are are handled respectively by the central processor for call-establishment and call-clearing procedures and by individual line controllers without seeking assistance to the central processor using separate control and data buses. The separation of the switching functions and the separation of the switching network into control and message handling subnetworks result in a packet switching system capable of operating at a significantly high speed and high throughput.

Intranode Overflow Control

During the call setup and subsequent packet switching phases, the header updating circuit 11 of each line controller accesses the overflow control table 33 as well as to call setup or outgoing route table in order to check for the presence of an overflow traffic on the desired outgoing route.

Figure 13:
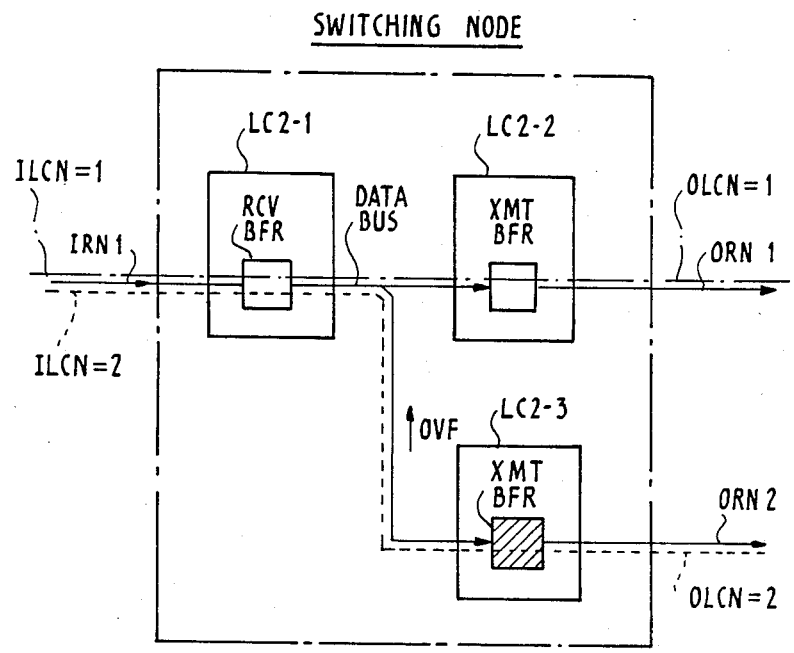
FIG. 13 is a schematic illustration useful for describing the operation of intranode overflow control.

Referring to FIG. 13, it is assumed that an incoming link identified by route number IRN1 is connected through a line controller 2-1 through data bus to line controllers 2-2 and 2-3 to establish virtual circuits identified by incoming logical channel numbers ILCN=1, ILCN=2, a common incoming route number IRN1, outgoing logical channel numbers OLCN1, OLCN2 and outgoing routes ORN1, ORN2, as illustrated. If the outgoing route ORN2 and hence the transmit buffer 16 of line controller 2-3 is overflowed. Transmit buffer 16 of the outgoing line controller now sends an overflow signal to its memory controller 13. In response to this overflow signal, the memory controller 13 accesses the incoming route table 32 to determine which incoming line controller or controllers the overflow traffic is to be communicated. This is done by accessing the incoming route number IRN1 and incoming logical channel number ILCN=2 of the incoming route table 32 as a function of the outgoing route number ORN2. Memory controller 13 informs the incoming logical channel number ILCN=2 through control bus 6 to the memory controller 13 of incoming line controller 2-1 identified by the incoming route number IRN1 to allow it to update its overflow control table 33 by rewriting the memory location of the incoming logical channel ILCN=2 with a congestion (CONG) signal. As a result, when the line controller 2-1 receives a packet, its header updating circuit 11 accesses the overflow control table 33 as a function of the incoming logical channel number subfield of the packet. If the logical channel number of the packet is ILCN=2, overflow control table 33 supplies a "discard" instruction to the receive buffer 14 (see FIG. 7). Packets destined to the outgoing route ORN2 are therefore denied entry to the receive buffer of line controller 2-1 to prevent it from becoming overflowed with long-waiting packets, allowing packets destined to the outgoing route ORN1 to be passed to the receive buffer of line controller 2-2.

When the overflow condition is relieved, a sequence of events similar to that described above is reinitiated by the transmit buffer of line controller 2-3 with the exception that the line controller 2-1 updates its overflow table 33 with an indication (FREE) that the incoming logical channel ILCN=2 is allowed entry to receive buffer of line controller 2-1.

INTERNODE OVERFLOW CONTROL

Figure 14:
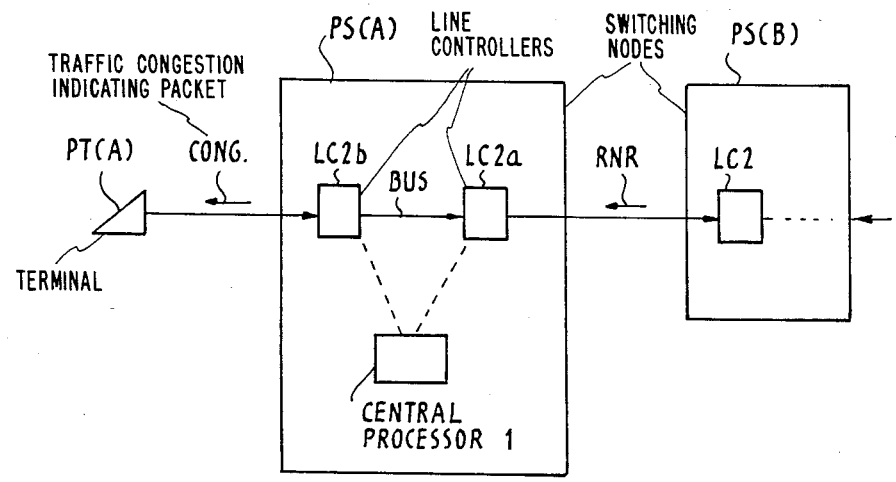
FIG. 14 is a schematic illustration useful for describing the operation of internode overflow control.

Assume that switching nodes PS(A) and PS(B) are participating in a connection between source and sink terminals as schematically illustrated in FIG. 14 and the traffic from node PS(A) to node PS(B) is overflowed at the entry to the receive buffer 14 of node PS(B). In the switching node PS(B), an overflow signal is supplied from the receive buffer 14 to the link overflow controller 27, which causes the RR/RNR generator 24 to update the RR/RNR (receive-ready/receive-not-ready) subfield of a packet from the transmit buffer 16 so that it signifies that the node PS(B) is not ready to receive traffic from node PS(A). The updated packet is sent to a line controller 2a of node PS(A) where it is received by the RR/RNR detector 23 of data-link layer controller 10, FIG. 6. Detector 23 provides an output to the link overflow controller 27, which starts monitoring the continuity of such overflow condition and supplies a halt-and-discard signal to the transmit buffer 16 if such a condition continues over a predetermined time interval and sends an overflow signal to the memory controller 13. Thus, the outgoing line controller 2a stops sending packets to the switching node PS(B). If the storage level of transmit buffer 16 of line controller 2a reaches a predetermined value following the cessation of transmission, transmit buffer 16 discards the overflowed packets.

Upon receipt of the overflow signal from the overflow controller 27, the memory controller 13 of the outgoing line controller 2a looks up the incoming route table 32 to read the incoming routing information including a source terminal address as well as incoming route number and incoming logical channel number and sends the retrieved incoming route information as well as the outgoing routing information to the central processor 1.

Central processor 1 rejects the establishment of a call through the overflowed outgoing route now informed by the outgoing line controller 2a when it receives a call-establishing control packet that is destined to the overflowed route. At the same time, the central processor 1 uses the incoming route number to identify the incoming line controller 2b and proceeds to generate a congestion packet (CONG) and transmits it to the source terminal through the incoming line controller 2b.

Upon receipt of a congestion packet, the source terminal PT(A) stops sending packets. If the congestion is relieved, the central processor of the switching node PS(A) sends a congestion-free (FREE) packet to the source terminal PT(A). If the congestion-free packet is received within a predetermined time interval, the terminal PT(A) reinitiates transmission of packets. However, if the congestion-free packet is not received within the predetermined time interval, the terminal PT(A) sends a control packet requesting the reestablishment of a connection through an alternate transmission link.

Figure 1:
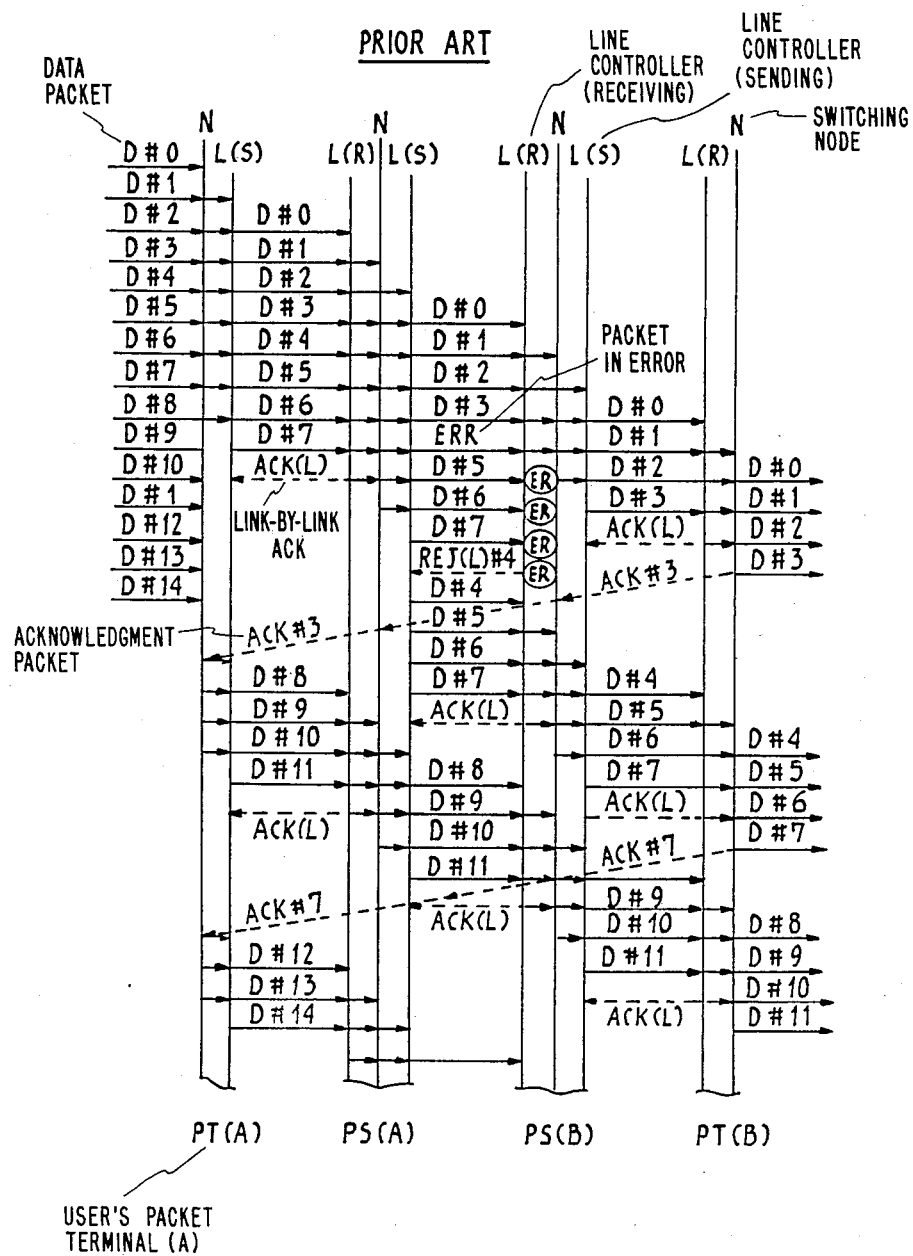
FIG. 1 is an illustration of packet transfer sequences according to the link-by-link method of flow control and retransmission employed in a prior art packet switched communications system.

FIG. 15 illustrates the contents of the routing table 57 of central processor 1 in respect of a switching node PS(B) in the network of FIG. 1. Switching node PS(B) has primary routes and alternate routes. With resect to the priorty route, the switching node PS(B) has outgoing routes #3, #0, #1 and #2 for terminal destinations PT(A), PT(B), PT(C) and PT(D), respectively. The alternate routes available for switching node PS(B) are route #2 for destinations PT(A) and PT(C) and route #3 for destination PT(D).

In FIG. 1, it is assumed that a connection is established between terminals PT(A) and PT(C) with nodes PS(A), PS(B) and PS(C) participating in the connection. If a congestion occurs in the route #1, the central processor 1 of switching node PS(B) updates the routing table 57 so that a congestion indication is given to the route #1 with the other routes being given a congestion-free indication. Likewise, congestion-free indications are initially given to all the routes available for alternate routing. When the re-routing request is received, the central processor of the switching node PS(B) accesses the routing table 57 to find an alternate route. Since the destination PT(C) is involved in the congestion, the route #2 to switching node PS(D) is selected to reestablish a connection between the node PS(B) and terminal PT(C). To provide the re-routing operation, the terminal sends a call-disconnect request packet to the switching node PS(B) to clear the route #1. Immediately following the disconnection, the central processor sends a call-establishing control packet to the switching node PS(D) over the alternate route #2.

END-TO-END FLOW CONTROL AND RETRANSMISSION

As described previously, the present invention provides a high speed, high throughput packet-switched communications system by end-to-end flow control and packet retransmission by eliminating the prior art link-by-link method of flow control and packet transmission.

Figure 16:
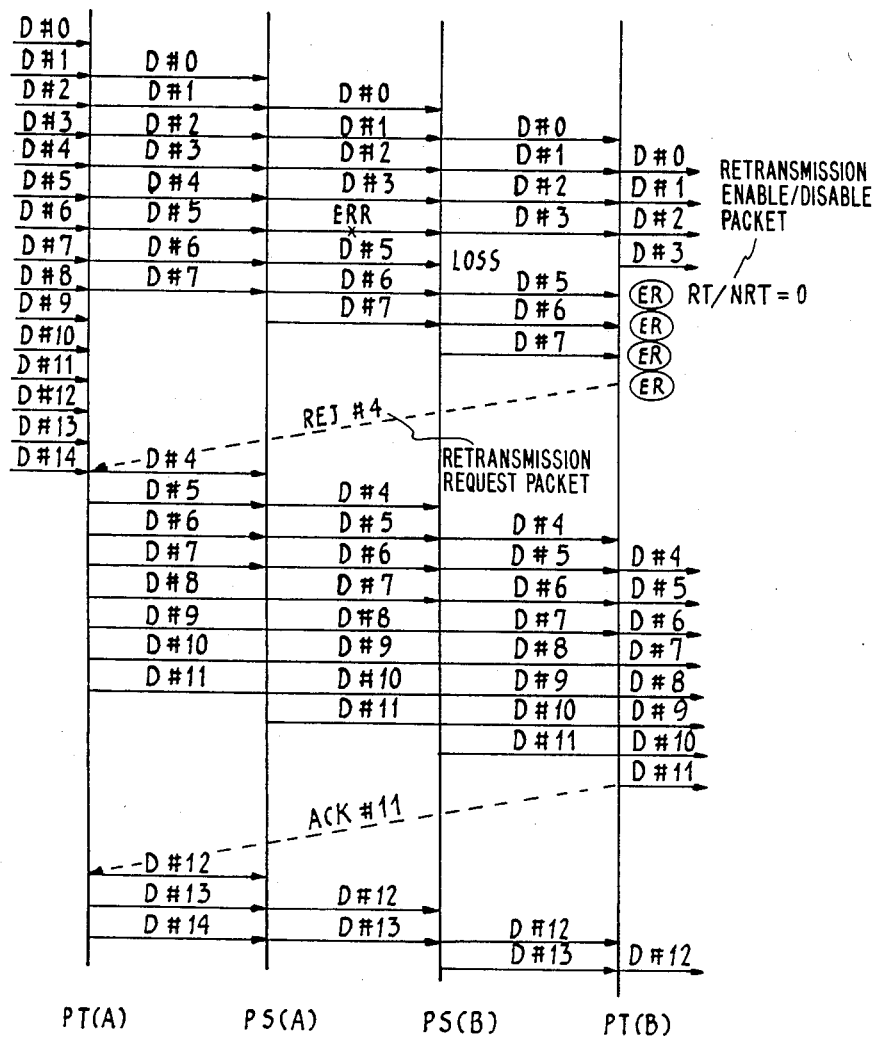
FIGS. 16 and 17 are illustrations of packet transfer sequences according to the end-to-end flow control and retransmission of the present invention.
Figure 17:
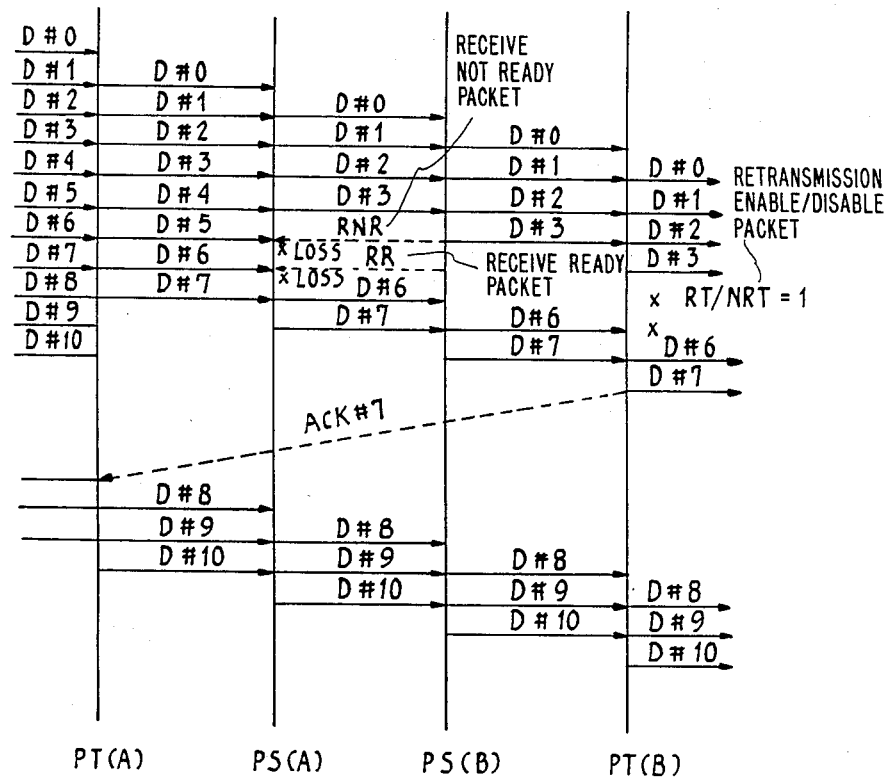

FIGS. 16 and 17 are illustrations of end-to-end packet transfer sequences according to the present invention.

FIG. 16 illustrates packet transfer sequences in which packets D#0 through D#14 are generated sequentially by a terminal and an FCS error occurs in packet D#4 during transmission between nodes PS(A) and PS(B) as in FIG. 1. When an FCS error in packet D#4 is detected by a node PS(B), it is discarded. When destination terminal PT(B) receives a packet D#5, it recognizes that packet D#4 contains an error and sends a retransmission request REJ#4 to the source terminal PT(A) by writing a binary "0" into the RT/NRT field. Retransmission begins with packet D#4 and ends with packet D#11. Retransmission may be initiated upon the receipt of packet REJ#n or in response to a time out oepration. For example, if a packet D#0 is received but no acknowledgment is received within a preset period of time from the node PT(B), node PS(A) retransmits packet D#0.

FIG. 17 is an illustration of sequences in which the RT/RNT subfield of the received packet is "1" indicating that retransmission of REJ packets is disabled. It is assumed that the receive buffer of destination node PS(B) is congested when it receives packet D#3 and node PS(B) returns an RNR frame to source node PS(A). FIG. 17 shows that the source node PS(A) forcibly discards packets D#4 and D#5. Upon the termination of the overflow of receive buffer of destination node PS(B), an RR frame is returned to the source node to allow retransmission of packets D#6 and D#7. The destination terminal PT(B) detects a sequence error in packets D#4 and D#5 and an acknowledgment ACK#7 is returned. Thus, the retransmission of packets D#6 through D#10 does not results in an increase in the propagation delay.

As described above, the present invention eliminates the need for acknowledgment and retransmission on a link-by-link basis with respect to message packets and causes the source and destination terminals to perform compensation for packets lost in the network due to overflows or bit errors, whereby the packet switching operation performed by each node and hence the processing time is significantly reduced and the throughput of a node is increased.

The traffic control at an entry point of the network effectively avoids a networkwide traffic congestion.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A packet switched communications system comprising a plurality of terminals, a plurality of switching nodes for serving said terminals and a plurality of transmission links interconnecting said terminals and said switching nodes, each of said terminals being capable of returning an acknowledgement to a source terminal when a packet is correctly received therefrom, transmitting a series of packets without receiving said acknowledgement and retransmitting to a destination terminal a packet which has not been correctly received, wherein each of said terminals includes means for effecting a determination of whether or not a packet to be exchanged between source and destination terminals is required to be retransmitted and effecting an omission of the retransmission of a packet which has not been correctly received when said packet is determined as not being required to be retransmitted.

2. A packet switched communications system comprising a plurality of terminals and a plurality of switching nodes for serving said terminals and a plurality of transmission links interconnecting said terminals and said switching nodes, said packet switched communications system being of a virtual circuit type in which a logical channel is permanently established through said transmission links between source and destination terminals in response to a control packet of multipacket message to allow message packets of the multipacket message to flow the established channel, each of said terminals being capable of retransmitting a packet to a destination terminal when the packet is not correctly received by the destination terminal, wherein each of said switching nodes comprises:
means for detecting the degree of congestion of traffic in a buffer which receives packets from an adjacent one of said switching nodes or terminals and transmitting a traffic control signal indicating the cessation of transmission of packets when the detected degree of congestion exceeds a predetermined value;
means responsive to said traffic control signal for halting the transmission of a packet which is to be transmitted to said adjacent switching or terminal;
means for detecting when said traffic control signal is present for a predetermined time interval and generating a timeout signal; means responsive to said timeout signal for preventing the establishment of a logical channel to said adjacent switching node;
means for determining the logical channel established between said adjacent switching node and said destination terminal and detecting a source terminal in accordance with the determined logical channel and preventing the transmission of packets from the detected source terminal; and
means for reestablishing a logical channel through an alternate transmission link to said destination terminal in response to said timeout signal.

3. A packet switching system comprising a plurality of line controllers, a central processor and a switching network interconnecting said line controllers and said central processor, said line controllers being associated with incoming transmission links and outgoing transmission links respectively, wherein:
each of said line controllers comprises:
means for detecting an overflow traffic when traffic carried by each one of said outgoing transmission links reaches a predetermined value and for identifying said one outgoing transmission link as having overflow traffic;
means for notifying the other line controllers of the detection of overflow traffic;
an overflow control table for storing data indicating that an overflow traffic occurs in said identified outgoing transmission link;
means for addressing said overflow traffic table in response to reception of a packet from the associated incoming transmission link;
means for transferring said packet through said switching network to one of said line controllers associated with the outgoing transmission link when said one line controller is not identified as having an overflow traffic; and
means for forcibly discarding said packet when said one outgoing transmission link is identified as having an overflow traffic.

4. A packet switched communications system having a plurality of switching nodes for serving a plurality of terminals through transmission links, wherein:
each of said terminals transmitting a packet of a network layer control protocol to one of said switching nodes; and
each of said switching nodes comprising means responsive to the network control protocol of said packet for routing said packet to one of said transmission links defined by said network layer control protocol of said packet, said routing means comprising:
a plurality of line controllers associated respectively with said transmission links each of said line controllers including means for appending a physical address of said packet at said defined transmission link to said packet updating the network layer control protocol of said packet with a logical address of said packet at said defined transmission link and sending said updated packet to one of said line controllers corresponding to said defined transmission link; and
a switching network for interconnecting said line controllers.

5. A packet switched communications system as claimed in claim 4, wherein each of said switching nodes comprises:
means for detecting an overflow of said packets sent in one direction of transmission on a first one of said transmission links and sending an overflow indicating signal in an opposite direction on a second one of said transmission links; and
means responsive to said overflow indicating signal for holding said packets in a buffer.

6. A packet switched communications system as claimed in claim 5, wherein each of said switching nodes further comprises means for relaying said overflow indicating signal to one of said terminals from which said packets have been transmitted.

7. A packet switched communications system as claimed in claim 4, wherein said packet contains a logical address of the packet, and wherein said routing means comprises:
a first line controller to which a first one of said transmission links is terminated;

a second line controller to which a second one of said transmission links is terminated;

a switching network for interconnecting said first and second line controllers;

said first line controller including a first memory for storing an address defining said second transmission link and means for updating said packet received from said first transmission link according to said address and routing said updated packet to said second line controller according to said address stored in said first memory;

said second line controller including a second memory for storing an address defining said first transmission link and means responsive to said updated packet for routing said packet to said second transmission link; and a central processor responsive to the network layer control protocol of said packet received at said first transmission link for rewriting said first and second memories.

8. A packet switched communications system as claimed in claim 7, wherein said second line controller includes means for detecting an overflow traffic in said second transmission link and transferring the address stored in said second memory to said first line controller, wherein said first line controller includes means responsive to the transferred address for preventing the packets destined to said second transmission link from being routed to said second line controller.

9. A packet switching system for serving a plurality of terminals through transmission links, each of said terminals transmitting a packet of data link layer control protocol including a network layer control protocol through a transmission link to said switching system comprising:

means responsive to the network control protocol of said packet for routing said packet to one of said transmisssion links defined by said network layer control protocol of said packet, said routing means comprising:

a plurality of line controllers associated respectively to said transmission links, each of said line controllers including means for appending an address of said defined transmission link to said packet and sending said packet with said address to one of said line controllers corresponding to said defined transmission link; and a switching network for interconnecting said line controllers.

10. A packet switching system as claimed in claim 9, further comprising:

means for detecting an overflow of said packets sent in one direction of transmission on a first one of said transmission links and sending an overflow indicating signal in an opposite direction on a second one of said transmission links; and means responsive to said overflow indicating signal for holding said packets in a buffer.

11. A packet switching system as claimed in claim 9, further comprising means for relaying said overflow indicating signal to one of said terminals from which said packets have been transmitted.

12. A packet switching system as claimed in claim 9, wherein said packet contains a logical address of the packet, and wherein first and second ones of said line controllers are associated respectively with first and second ones of said transmission links, wherein:

said first line controller includes a first memory for storing an address defining said second transmission link and means for updating said packet received from said first transmission link according to said address and routing said updated packet to said second line controller according to said address stored in said first memory;

said second line controller include a second memory for storing an address defining said first transmission link and means responsive to said updated packet for routing said packet to said second transmission link; and a central processor responsive to the network layer control protocol of said packet received at said first transmission link for rewriting said first and second memories.

13. A packet switching system as claimed in claim 12, wherein said second line controller includes means for detecting an overflow traffic in said second transmission link and transferring the address stored in said second memory to said first line controller, wherein said first line controller includes means responsive to the transferred address for preventing the packets destined to said second transmission link being routed to said second line controller.

14. A packet switching system in a packet switched communications networks, comprising:

a plurality of line controllers associated respectively with transmission links for receiving a control packet and a message packet from the transmission links, each of said packets containing an incoming logical channel number;

a switching network; and central processing means associated with said line controllers through said switching network for determining an outgoing logical channel number in response to the incoming logical channel number from said line controllers and transmitting to said line controllers a routing signal indicating a relationship between said outgoing logical channel number and an outgoing transmission link;

each of said line controller comprising:

a memory;

means for writing said routing signal into said memory when said outgoing transmission link is associated with one of said line controller; and means for accessing said memory in response to said incoming logical channel number containing in a received incoming message packet to read out a stored outgoing logical channel number and transmitting an outgoing message packet containing said outgoing logical channel number and an identification of said outgoing transmission link through said switching network to one of said line controllers which is associated with said outgoing transmission link through said switching network.

15. A packet switching system as claimed in claim 14, wherein said switching network comprises a control data transfer subnetwork for transferring said routing signal between said central processing means and said line controllers and a packet transfer subnetwork for transferring said outgoing message packet between said line controllers.

* * * * *